(12) United States Patent
Akhras et al.

(10) Patent No.: US 8,337,603 B2
(45) Date of Patent: Dec. 25, 2012

(54) APPARATUS FOR SEPARATION OF GAS-LIQUID MIXTURES AND PROMOTING COALESCENCE OF LIQUIDS

(75) Inventors: Abdul Rahman Zafer Akhras, Dhahran (SA); Regis Didier Vilagines, Dhahran (SA); Maher Maqbool Shariff, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 13/085,076

(22) Filed: Apr. 12, 2011

(65) Prior Publication Data

US 2011/0247500 A1 Oct. 13, 2011

Related U.S. Application Data

(60) Provisional application No. 61/323,140, filed on Apr. 12, 2010.

(51) Int. Cl.
*B01D 19/00* (2006.01)

(52) U.S. Cl. .............................. 96/184; 96/189; 96/209

(58) Field of Classification Search .................... 96/209, 96/210, 211, 212, 189, 184, 182, 183; 95/253, 95/258
See application file for complete search history.

(56) References Cited

U.S. PATENT DOCUMENTS

| | | | |
|---|---|---|---|
| 2,228,401 A * | 1/1941 | Pressler | 96/164 |
| 2,888,096 A | 5/1959 | Evans | |
| 3,850,816 A * | 11/1974 | Koch | 210/512.1 |
| 3,881,900 A | 5/1975 | Campbell | |
| 4,070,168 A * | 1/1978 | Beattie | 96/210 |
| 4,322,233 A * | 3/1982 | Sisk | 55/426 |
| 4,363,641 A | 12/1982 | Finn, III | |
| 4,512,716 A * | 4/1985 | McHenry et al. | 415/205 |
| 4,539,023 A | 9/1985 | Boley | |
| 4,617,031 A | 10/1986 | Suh | |
| 4,778,494 A * | 10/1988 | Patterson | 96/183 |
| 4,824,449 A | 4/1989 | Majoros | |
| 4,983,283 A | 1/1991 | Grey | |
| 5,080,792 A * | 1/1992 | McGovern et al. | 210/512.1 |
| 5,203,891 A | 4/1993 | Lema | |
| 5,415,776 A | 5/1995 | Homan | |
| 5,502,984 A | 4/1996 | Boehde | |
| 5,643,470 A | 7/1997 | Amini | |
| 5,771,844 A | 6/1998 | Dietz | |
| 5,843,211 A * | 12/1998 | Bielefeldt | 95/269 |
| 6,409,808 B1 * | 6/2002 | Chamberlain et al. | 96/182 |
| 6,458,191 B1 * | 10/2002 | Lingelem et al. | 96/209 |
| 6,537,458 B1 | 3/2003 | Polderman | |
| 6,673,135 B2 | 1/2004 | West | |
| 6,773,492 B1 * | 8/2004 | West | 96/189 |
| 6,814,941 B1 * | 11/2004 | Naunheimer et al. | 422/147 |
| 6,821,322 B2 | 11/2004 | Milia | |
| 6,991,114 B2 | 1/2006 | Allen, II | |
| 7,001,448 B1 * | 2/2006 | West | 95/271 |
| 7,144,503 B2 | 12/2006 | Oserød | |
| 7,278,543 B2 | 10/2007 | Sagatun | |

(Continued)

*Primary Examiner* — Duane Smith
*Assistant Examiner* — Douglas Theisen
(74) *Attorney, Agent, or Firm* — Abelman, Frayne & Schwab

(57) ABSTRACT

Provided herein is a conditioning apparatus that includes a geometrical configuration having an inlet flow deceleration conduit and a cyclonic tube to effectuate both liquid-gas separation and droplet coalescence. The apparatus is typically positioned at the inlet of a separator vessel used for removing water and gas from extracted crude oil containing entrained water and gas. The apparatus promotes droplet coalescence and gas separation for mixed fluids flowing into an existing water and oil separation device.

26 Claims, 20 Drawing Sheets

U.S. PATENT DOCUMENTS

| | | |
|---|---|---|
| 7,413,669 B2 | 8/2008 | Gonzalez |
| 7,435,290 B2 | 10/2008 | Lane |
| 2005/0145562 A1* | 7/2005 | Allen et al. .................. 210/519 |
| 2008/0017594 A1 | 1/2008 | Sarshar |
| 2009/0205488 A1* | 8/2009 | Betting et al. .................. 95/30 |

* cited by examiner

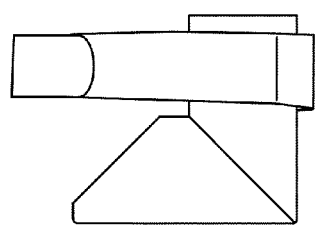
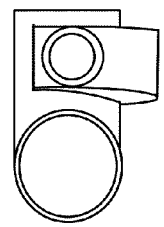
FIG. 7    FIG. 8
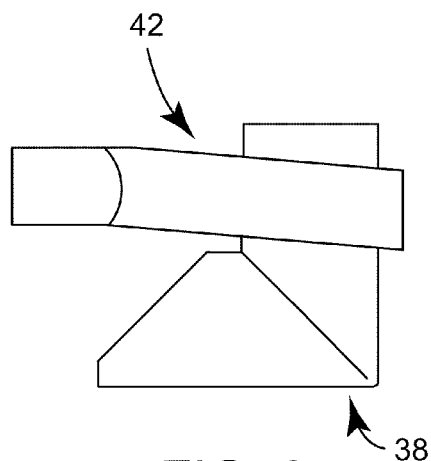
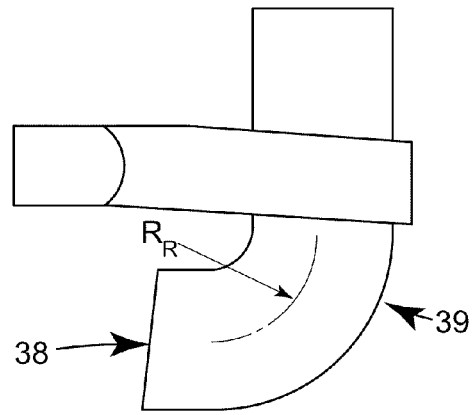
FIG. 9    FIG. 10
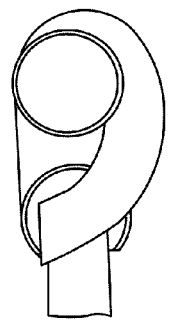
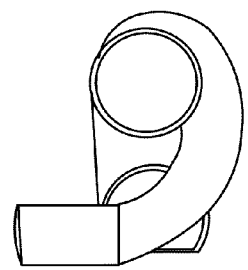
FIG. 11A    FIG. 11B

APPARATUS FOR SEPARATION OF GAS-LIQUID MIXTURES AND PROMOTING COALESCENCE OF LIQUIDS

RELATED APPLICATIONS

This application is related to and claims the benefit of U.S. Provisional Patent Application Ser. No. 61/323,140 filed on Apr. 12, 2010, which is incorporated by reference herein in its entirety.

BACKGROUND OF THE INVENTION

1. Field of the Invention

This invention relates to an apparatus for separation of gas from gas-liquid mixtures and promoting droplet coalescence of different liquids in the gas-liquid mixture.

2. Description of Related Art

Liquid/gas separation and droplet coalescence are important aspects of crude oil processing, especially at the early stages of production from the well head. The main goal of separator vessels, typically located in a Gas Oil Separation Plant ("GOSP"), is to separate the fluids and obtain oil of satisfactory quality having reduced water and gas content. As the water cut increases, oil production from the separator vessel is adversely influenced.

U.S. Pat. No. 2,228,401 describes a centrifugal device for separating gases from oil in which liquid is forced under pressure through a conduit connected via a flange in a substantially tangential direction. Liquid enters the conduit and is subjected to centrifugal force, and liquid separates into the lower part of the conduit.

U.S. Pat. No. 4,070,168 describes an inlet assembly, for mounting within a separator vessel, in the form of a "snail shell" shape with a spiral side wall. Pressurized crude oil is delivered tangentially to the inner end of the spiral side wall. Gas is centrifugally separated in the central portion of the spiral, and liquids flow along the larger radius of the outer portion.

The apparatus described in U.S. Pat. Nos. 2,228,401 and 4,070,168 are used only to separate gas from liquid, and thus separate treatment is required if the liquid is a mixture of oil and water. In addition, these devices do not control the momentum of the liquid, thus potentially causing any oil and water mixtures to emulsify.

U.S. Pat. No. 4,778,494 discloses a fluid flow diverter and separator for use in separator vessels. The apparatus is a cyclone or centrifugal flow diverter structure, with an inner cylindrical wall and an outer cylindrical cap member surrounding the inner cylindrical wall. Under the swirling conditions, there is substantial separation of gas from the liquid, and partial separation or demulsification of the oil and water. In conditions of increased flow rates, the outer cap serves to minimize agitation of the partially separated or demulsified oil and water.

U.S. Pat. No. 6,458,191 discloses a separator inlet for use in a separator tank. The fluid is introduced into a spiral channel and flows in the housing to a centrally disposed outlet while releasing any gas in the stream. Fluid then flows downward through the outlet, and any remaining gas is captured by a funnel-shaped trap and conveyed to the surface.

U.S. Pat. No. 6,409,808 also discloses a separator inlet for use in a separator tank. Gases are discharged based on cyclonic effect, and the oil and water mixture is discharged into an oil layer in the separator tank. According to the patent, discharge into the oil layer promotes a more rapid and efficient separation of the oil and water, as compared to prior methods where the oil and water mixture was discharged in the water layer.

Related U.S. Pat. Nos. 7,001,448 and 6,773,492 disclose a system for separating an entrained liquid component from a gas stream, as improvements to a vortex tube cluster in the form of a tube-on-tube design. The improvement described is the use of a cylinder at the bottom of the vortex tube, in place of prior art diverter plates. The cylinder contains droplets and prevents re-entrainment of droplets in the gas phase. The references also describe two-phase liquids (oil and water), and states that the improved vortex tube configuration prevents propulsion of gas-laden liquid to the liquid outlet. Notably, these references do not disclose that the improved vortex tube improves droplet coalescence. Indeed, the references specifically describe use of a downstream liquid coalescing apparatus.

Therefore, a need exists for an apparatus that can be installed at the inlet of either a horizontal or vertical separator vessel to promote liquid-gas separation, and that further promotes coalescence of the different types of liquids, i.e., oil and water, to facilitate their separation in the vessel. Accordingly, it is an object of the present invention to improve existing separator vessels and maintain oil production levels even when the water cut increases, e.g., after years of production from the particular well.

SUMMARY OF THE INVENTION

The present invention comprehends a conditioning apparatus that includes a geometrical configuration having an inlet flow deceleration conduit and a cyclonic tube to effectuate both liquid-gas separation and droplet coalescence. The apparatus is positioned at the inlet of a separator vessel used for removing water and gas from extracted crude oil containing entrained water and gas. The apparatus is not intended as a replacement for water and oil separation devices; rather, it promotes droplet coalescence and gas separation for mixed fluids flowing into an existing water and oil separation device and thus decreases the requisite residence time in the separation device.

The conditioning apparatus separates gas from a multi-component flowing fluid containing a mixture of gas, water and oil, and also promotes the coalescence of water droplets in the oil-water mixture. The conditioning apparatus generally includes a fluid deceleration member an entry portion and a transition portion; a vertically aligned cyclonic member; and a return member. The entry portion has an inlet for receiving the flowing fluid mixture and a curvilinear conduit having an increasing cross-sectional flow area downstream of the inlet, configured to decelerate the incoming flow and thereby reduce the momentum of the flowing mixture. Controlled centrifugal forces are created by the transition portion between the entry portion and the cyclonic member, thereby promoting droplet coalescence in the oil-water liquid phase. The cyclonic member imparts a cyclonic effect that further promotes separation of gas from the liquid (oil and water) phase. The return member, located proximate to the inside surface of the gravity separation vessel, directs the fluid in a direction that is opposite to the direction of the main flow in the separation vessel, thereby maximizing the total fluid path length inside the separation vessel, using the vessel's typically concave end shape as a guide vane for the liquid phase, and bounding the cyclonic effect to the inside of the inlet device, i.e., limiting the cyclonic effect to the interior of the inlet device according to the invention.

The conditioning apparatus of the present invention achieves increased separator vessel oil production as compared to prior art devices based upon comparable water cuts. The separation process and droplet coalescence commences upon entry of fluids into the separator vessel inlet, thereby achieving increased separation efficiency. Furthermore, the apparatus simultaneously enhances gas-liquid separation and promotes coalescence of water droplets in the oil-water-gas mixture.

The apparatus is described in connection with a preferred embodiment in which it is integrated, as an inlet device, into a multiphase gravity separator vessels used in crude oil and gas production processes, although it can also benefit other applications which require separation of gas and coalescence of water in an oil-water-gas mixture. The apparatus is economical to construct and install, and is maintenance free, having no moving parts and requires no power. In addition, the present invention does not require addition of chemicals to promote droplet coalescence.

In contrast to prior art multiphase fluid flow conditioners positioned at the inlet of a gravity separator that rely principally on the cyclonic effect, the apparatus of the present invention combines the following physical phenomenon:

a. global flow deceleration to decrease the momentum of the incoming flowing mixture;

b. application of a controlled centrifugal effect to promote droplet coalescence in the liquid phases; and c. application of a cyclonic effect to promote separation of gas from the liquid phases.

Installation of the inlet conditioning apparatus of the present invention enhances droplet coalescence and separation of the fluid mixture introduced into the oil-water separator vessel. The optimized combination of the above benefits is achieved due to the specific geometrical design configuration of the apparatus described in further detail herein and with the benefit of the accompanying drawings.

BRIEF DESCRIPTION OF THE DRAWINGS

The invention will be described in further detail below and with reference to the attached drawings in which the same or similar elements are referred to by the same number, and where:

FIG. 7 is a side elevational view of the apparatus of the present invention;

FIG. 8 is a front elevational view of the apparatus of the present invention;

FIG. 9 is a side elevational view of the apparatus of the present invention showing a declined fluid deceleration member;

FIG. 10 is a side elevational view of the apparatus of the present invention showing a the return member with a curved entry portion;

FIG. 11A is a top plan view of the apparatus of the present invention in which the inlet pipe is oriented at 90° with respect to the end section of the entry portion;

FIG. 11B is a top plan view of the apparatus of the present invention in which the inlet pipe is oriented at 0° with respect to the end section of the entry portion;

DETAILED DESCRIPTION OF THE INVENTION

Figure 1:
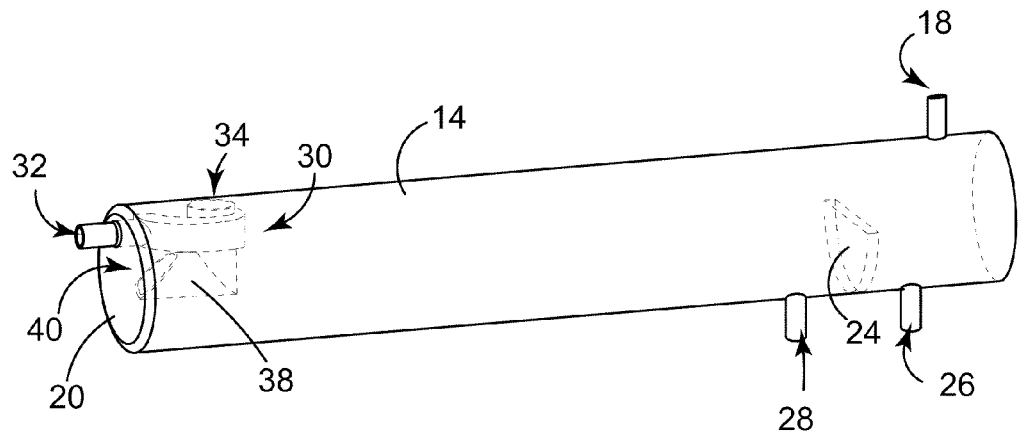
FIG. 1 is a schematic illustration of the apparatus of the present invention integrated in a separator vessel.
Figure 2A:
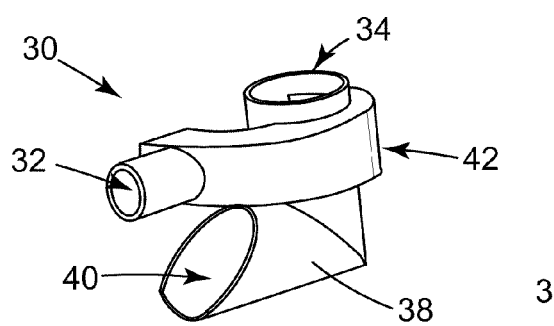
FIGS. 2A-2D are top and side perspective views of the apparatus of the present invention.
Figure 2B:
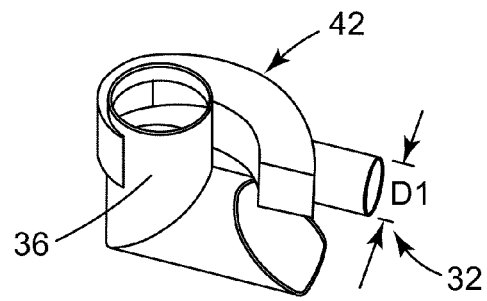
Figure 2C:
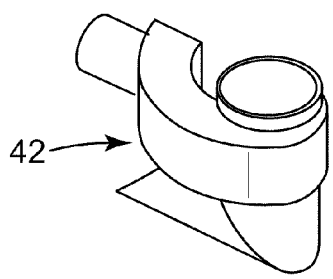
Figure 2D:
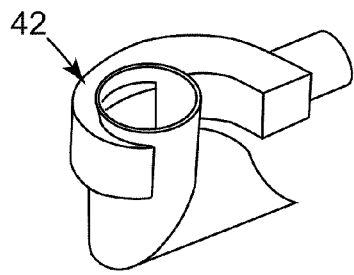
Figure 4:
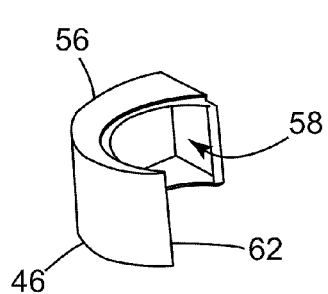
FIG. 4 is a perspective view of a transition portion joined to and in fluid communication with the entry portion and the cyclonic member that is part of the apparatus of the present invention.
Figure 3A:
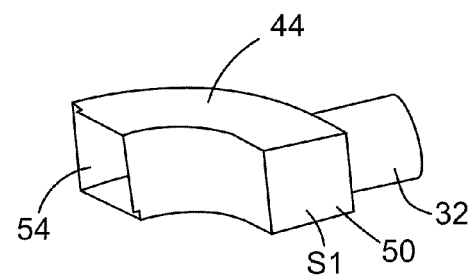
FIG. 3A is a perspective view of the inlet pipe and the entry portion that forms part of the apparatus of the present invention.
Figure 3B:
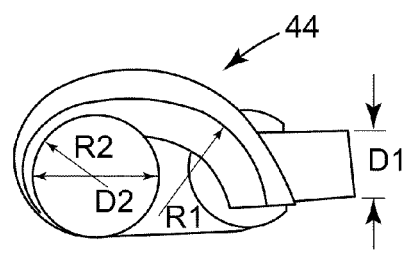
FIG. 3B is a top view of the inlet pipe and the entry portion shown in FIG. 3A.
Figure 5:
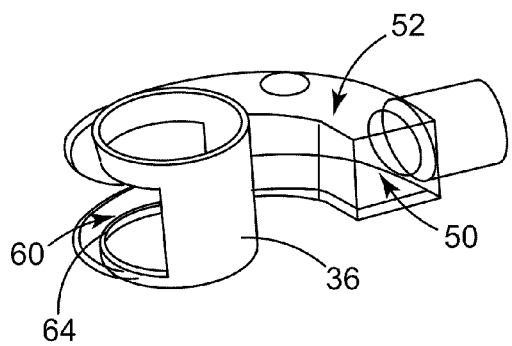
FIG. 5 is a perspective view of the cyclonic member that is part of the apparatus of the present invention.
Figure 6:
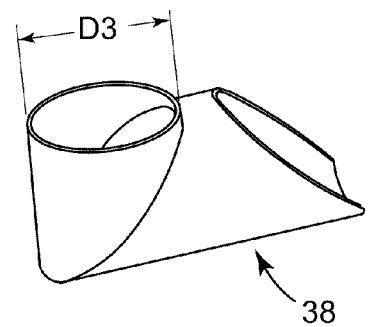
FIG. 6 is a perspective view of the return member that is part of the apparatus of the present invention.

Referring to FIG. 1 the apparatus 30 of the present invention is shown positioned within a gravity separation vessel 14, e.g., a gas oil separation vessel (commonly known in the industry as a "GOSP" vessel). A mixture of gas, water and oil is conveyed into an entry pipe 32 of the apparatus 30. In general, a majority of the gas content of the mixture rises and exits apparatus 30 via a riser outlet 34, which is at the top end of the cyclonic member 36. The riser outlet 34 can be completely or partially open. When riser outlet 34 is partially open, the riser outlet 34 can have a second riser to minimize the amount of liquid entrained in the gas phase fluid exiting from the top of riser outlet 34 (as shown in the figures associated with the example provided herein). Thus, a majority of gas in the mixture is recovered from the upper outlet 18 of the gravity separation vessel 14, rather than being mixed with the liquid phase, i.e., oil and water. The liquid mixture, having a substantial portion of the water coalesced is further described below due to the flow pattern created by apparatus 30, exits the return member 38 via a generally horizontal outlet portion 40. The effluent containing oil and coalesced water is directed to the inside surface of the end wall 20 of the gravity separation vessel 14, thus minimizing additional turbulence that can reverse the coalescence produced by apparatus 30 and limiting the cyclonic effect to the interior of the inlet device.

As is conventionally known, water and oil separate into phases in the gravity separation vessel 14, with the water being discharged via outlet 28, and oil, overflowing wall 24 in gravity separation vessel 14, being recovered via outlet 26. Due to the enhanced water droplet coalescence achieved by apparatus 30 of the present invention, the separation rate is increased and therefore, for any given water-cut, the total flow through the gravity separation vessel 14 can be increased.

Referring in general to FIGS. 2A-2D, 3A, 3B and 4-8, the construction and configuration of the conditioning apparatus 30 will now be described in further detail. Conditioning apparatus 30 is in a geometric configuration that promotes gas separation and water coalescence. The structure includes a fluid deceleration member 42, a cyclonic member 36 and a return member 38. Fluid deceleration member 42 includes an entry portion 44 and a transition portion 46. While the various members 42, 36 and 38 are described separately and with separate portions, it is to be appreciated by one of ordinary skill in the art that apparatus 30 can be formed as a monolithic structure, e.g., it can be cast or molded, or it can be assembled from separate parts, e.g., by welding or otherwise attaching separate components together which may or may not correspond precisely to the members and portions described herein.

Fluids from production lines that typically originate from an oil producing well head are conveyed to the apparatus 30 via inlet pipe 32. Inlet pipe 32, having a diameter D1 or an equivalent diameter of D1 if the inlet pipe does not have a circular cross-section, is in fluid communication with and connected to curvilinear entry portion 44 of fluid deceleration member 42.

The entry portion 44 has an inlet 50 for receiving the flowing fluid mixture from the inlet pipe 32 and a curvilinear conduit 52 having an increasing cross-sectional flow area downstream of the inlet 50 to the interface to transition portion 46, section 54. Inlet 50 is characterized by a cross-sectional area S1.

The orientation between inlet pipe 32 and entry portion 44 of the fluid deceleration member 42 causes the fluid to enter the inlet 50 of entry portion 44 at an angle that is between 90 degrees (i.e., normal) to and about 0 degrees, (i.e., tangentially) as shown in FIGS. 11A and 11B, respectively.

In certain preferred embodiments, the cross-sectional area S1 of the inlet section 50 is about 10% greater than the cross-sectional area of the inlet pipe 32 having its equivalent diameter D1.

In one embodiment, entry portion 44 is characterized by a cross-section that increases along a curvilinear abscissa from the inlet section 50 to its outlet section 54. The ratio of the cross-section of the outlet section 54 and the inlet section 50 is generally in the range of about 1.05:1 to about 2.0:1. The radius of curvature R1 of the center-line of the entry portion 44 is less than about 500% of the diameter D1 of the inlet pipe 32 (wherein the center-line is defined as the line joining all the center points of the successive cross sectional surfaces of the curvilinear duct forming entry portion 44).

The cross-sectional shape at the inlet section 50, although depicted as generally square, can be a rectangle, a rounded rectangle, a circle, an oval, or other suitable shape. In certain preferred embodiments, the shape of the cross-section along the curvilinear path of the entry portion 44 through which the fluid passes progressively changes into a rectangular shape. The progressively changing cross-section of duct 44 into a rectangular shape advantageously maximizes the opening area, thus allowing the gas to escape from the liquid mixture at an early stage and to obtain a uniform velocity profile and minimize shear stresses in the fluid flow.

Downstream from outlet section 54 of the curvilinear entry portion 44 is transition portion 46, which is characterized by a generally curvilinear-shaped outer wall 56 and a curvilinear-shaped inner opening region 58 that is open and connected to, or integral with, the inlet 60 in the cyclonic member 36.

The radius of the centerline (R2 in FIG. 3B) can be continuously decreasing or decrease in a step-wise manner, for instance, wherein the shape is or is similar to a portion of a spiral, or a two or more connected arc sections having different center points and radii.

Inlet 60 generally spans about one half or more of the circumference of member 36 and has a height that matches that of region 58 of the transition portion 46. In addition, the inlet 60 is dimensioned so that the ratio of its area to the cross-sectional area S1 of inlet 50 is in the range of area about 1.2:1 to about 5.0:1. The dimensions of inlet 60 generally has a ratio with respect to the cross-sectional area S1 is preferably the maximum ratio capable of providing a smooth deceleration of the fluids without promoting mixing between the phases and without disturbing the centrifugal effect. Generally, the dimensions of inlet 60 can be optimized to provide a smooth entry in the cyclonic member 36 to the flow exiting member 42. This optimization can be accomplished with the use of computational fluid flow simulations, e.g., to define an ideal position and ideal dimensions for opening 60.

The outer edge 62 of the transition portion 46 intersects the edge 64 of inlet 60 of the cyclonic member 36 in a generally tangential relation. Accordingly, fluid passes from the deceleration member 42 into the cyclonic member 36 and continues its flow in the cyclonic member 36 at an approximately constant radial velocity.

In certain embodiments, and referring to FIG. 9, the fluid path defined by the fluid deceleration member 42 is characterized by an angle that is declined from the horizontal, e.g., up to about 8 degrees, preferably about 4 degrees. In this configuration, gravitational forces promote the flow of the fluid toward opening 58 and prevents backflow. However, the angle should be sufficiently small to ensure that the desired deceleration is achieved in the fluid deceleration member 42.

The flow in transition portion 46 and in the cylindrical cyclonic member 36 causes controlled centrifugal forces that promote coalescence of both the water and oil droplets in the liquid phase.

The vertically aligned cyclonic member 36 is axi-symmetrical around a vertical centerline through member 36 with the exception of its flow entry inlet 60. The upper end of member 36 is partially or totally open to allow gases to rise out of the apparatus 30. In member 36, the radius of curvature of the mean flow line (i.e., the center-line under ideal flow conditions) and the flow kinetic energy are decreased simultaneously. The internal diameter D2 of member 36, as measured in any horizontal plane crossing member 36, is in the range of about $(2*S1)^{1/2}$ to about $(5*S1)^{1/2}$. The internal diameter D2 of member 36, in certain embodiments, increases from the top portion, i.e., where liquid enters at its flow entry inlet 60, to the bottom portion, i.e., where member 36 adjoins return member 38. This geometry is contrary to existing cyclonic devices and advantageously allows for a combination of a cyclonic effect with a decrease of fluid momentum within member 36.

Experimental analysis has demonstrated that bulk gas-liquid separation together with smooth deceleration of the liquid phase flow can be achieved in the apparatus of the present invention for inlet pipes 32 having diameters D1 in the range of about 3 inches to about 12 inches, or in certain embodiments much larger, e.g., up to 24 inches to 36 inches, depending on the dimensions of the gravity separation vessel, the flow rate, and other factors. When the apparatus is appropriately configured and dimensioned based on the incoming flow characteristics, a large part of the gas phase in the flow exits apparatus 30 via riser outlet 34 and the oil and water flow through inlet 60 in the cyclonic member 36 to enter the return portion 38.

Transition portion 46 connects the flow in curvilinear entry portion 44 to cyclonic member 36. The radius R2 of the center-line of the transition portion 46 is between the radius of curvature R1 of the curvilinear entry portion 44 and the radius of the cyclonic member 36 (D2/2). At the junction of the transition portion 46 and the outlet section 54 of the curvilinear entry portion 44, the radius of the centerline is generally larger than the radius of the center-line of the curvilinear entry portion 44, and in certain embodiments decreases along the spiral-shaped path to a value approaching the diameter of the generally vertical cyclonic member 36 (D2). The decrease in the radius of the centerline can be continuous or step-wise, for instance, wherein the shape is or is similar to a portion of a spiral, or a two or more connected arc sections having different center points.

In return member 38, the total fluid volumetric flow rate and the gas volume fraction have been decreased due to the bulk separation achieved in the cyclonic member 36. The cross-sectional area of the horizontal portion of the return member 38 increases slightly in the direction of fluid flow. In certain preferred embodiments, the cross-section progressively increases from about 1.1 to about 2.2 times the maximum cross-sectional area of the cyclonic member 36. In addition, the cross-sectional area of flow outlet 40 is greater than or equal to twice the cross-sectional area of inlet 32. The flow from outlet 40 is directed in a direction that is opposite to the direction of the fluid flow in vessel 14. This advantageously maximizes the length of the flow path lines inside the vessel, and further utilizes the concave shape of the interior vessel end wall 20 as a guide vane for the liquid flow.

Return member 38 is specifically positioned, configured and dimensioned in order to optimize performance with the apparatus of the invention. Outlet 40 is positioned close to the gas-liquid free surface inside the gravity separation vessel. Experimental analysis has demonstrated that outlet 40 is optimally positioned when it is only partially submerged in the liquid phase within the vessel 14, with its upper portion remaining above the liquid level. Thus, the flow in return member 38 preferably undergoes a change in its average direction between the inlet section located in a horizontal plane at the intersection of cyclonic member 36 and return member 38, and outlet 40.

The radius of curvature ($R_R$) of the center-line of the elbow-shaped duct 39 that forms part of the return member 38 is preferably in the range of about $((\pi(D3/2)^2/3)^{1/2}$ to about $((n(D3/2)^2)^{1/2}$, where D3 is the diameter of the entry portion of the return member 38, which is defined an imaginary section of the generally vertical cyclonic member 36 at approximately the height of the top of the horizontal portion of the return member 38. This range advantageously provides both satisfactory flow guidance and promotes droplet coalescence in return member 38. In alternative embodiments, the return member 38 can include internal guide vanes or grids to eliminate residual swirl in the liquid-phase flow exiting the apparatus 30.

When the apparatus 30 is positioned at the inlet of a horizontal gravity separation vessel 14, a favorable guide vane effect will be obtained if the return member 38 is configured and positioned in a manner that places the outlet 40 facing towards the upstream end plate 20 of vessel 14, as shown in FIG. 1. In embodiments in which apparatus 30 is positioned at the inlet of a vertical gravity separator, the cyclonic member 36 can be oriented in any vertical plane.

EXAMPLE

Figure 12A:
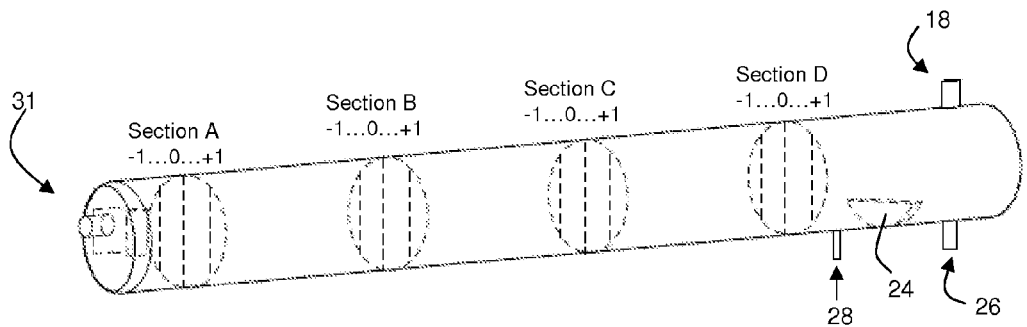
FIG. 12A is a schematic illustration of a separator vessel having a conventional momentum breaker box used in a comparative computer analysis.
Figure 12B:
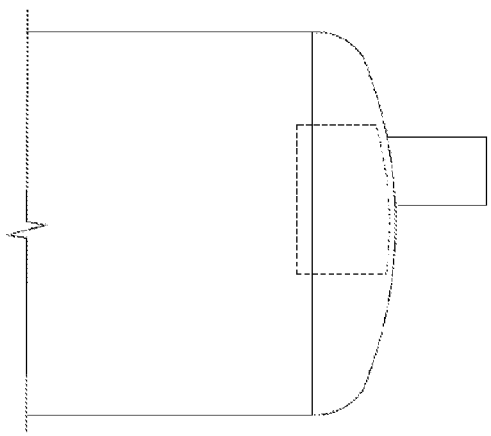
FIG. 12B is a side view of the inlet of the separator vessel of FIG. 12A.
Figure 12C:
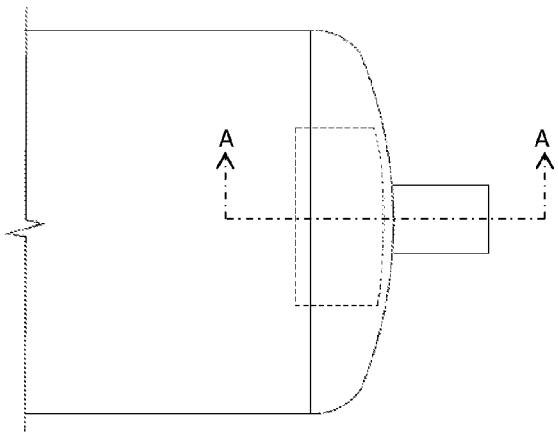
FIG. 12C is a top view of the inlet of the separator vessel of FIG. 12A.
Figure 12D:
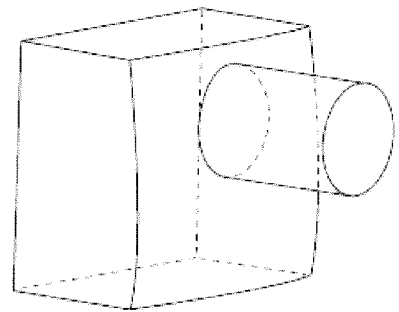
FIG. 12D is an isometric view of the conventional momentum breaker box used in the comparative computer analysis.

High density computer simulations were conducted to approximate the flow of a multiphase fluid into a horizontally-oriented gas oil separation vessel. A first model vessel includes a conventional momentum breaker box 31 at the inlet (FIG. 12A). A second model vessel includes a conditioning apparatus 30 (FIG. 13A) as described herein. The model of each vessel includes a gas outlet 18, water outlet 28, overflow wall or baffle 24, and oil outlet 26.

The simulations were conducted for a 45.5 meter long, 4.26 meter diameter, three-phase high-pressure production trap, with the configuration and dimensions for the conventional momentum breaker box 31 shown and described with reference to FIGS. 12B-12G, and configuration and dimensions for the apparatus 30 of the present invention shown described with reference to FIGS. 13B-13I. The computational results obtained are based on the flow properties in Table 1:

TABLE 1

|  | OIL | WATER | GAS |
| --- | --- | --- | --- |
| Flow rate (bbl/day) | 180,000 | 54,000 | 2,366,000 |
| Density (Kg/m3) | 766.16 | 1168.03 | 12.22 |
| Viscosity (Pa · s) | 1.24 10-3 | 4.00 10-4 | 1.29 10-5 |
| Droplet or bubble size (mm) | — | 0.1 | 0.1 |

Figure 12E:
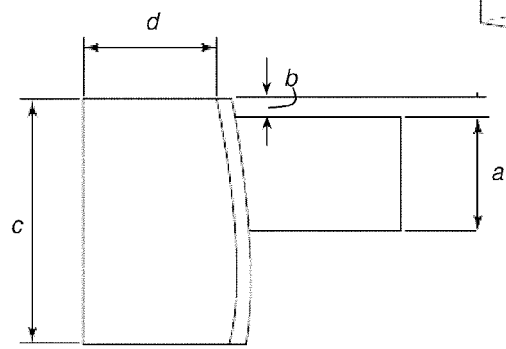
FIG. 12E is a sectional view of the conventional momentum breaker box along section A-A in FIG. 12C.
Figure 12F:
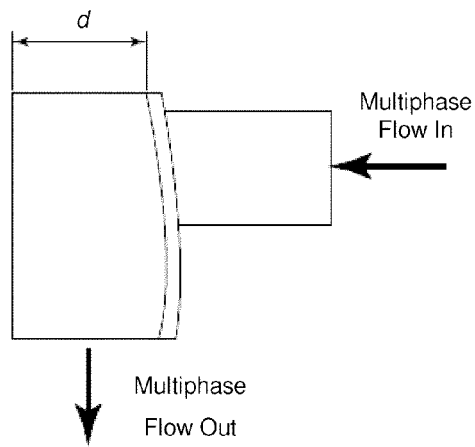
FIG. 12F is a side view of the conventional momentum breaker box.
Figure 12G:
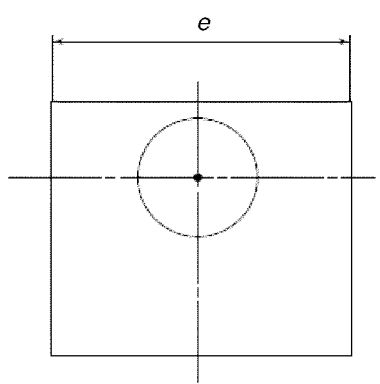
FIG. 12G is a front view of the conventional momentum breaker box.

In particular, referring to FIGS. 12E-12G, the dimensions for the conventional momentum breaker box used in the computer simulation are as follows: a=76.2 cm; b=11.2 cm; c=164.3 cm; d=98.4 cm; and e=195.4 cm.

Referring to FIGS. 13E-13I, the modeled flow conditioner described herein has the following dimensions:

Inlet pipe diameter f=76.2 cm
Inlet height g=80.1 cm
Height h of fluid deceleration member=88.5 cm
Width i of inlet=62.1 cm
Height j of transition portion=129.3 cm
Height k of transition portion at terminating end=110.8 cm
Overall height l of apparatus=280.5 cm
Length m of bottom portion of cyclic member and return member=197.0 cm
Length n of extended portion of return member=67.0 cm
Angle a at bottom portion of cyclic member and return member=45°
Angle b at end of return member=45°

Height o of primary riser of cyclonic member (between top end and juncture with return member)=150.5 cm Diameter p of primary riser=130.0 cm Overall height q of second riser of cyclonic member=95.0 cm Protruding height r of second riser=29.5 cm Diameter s of secondary riser=70.0 cm Lip t at return member=2.0 cm The fluid deceleration member, including curvilinear entry portion and transition portion, is characterized by an outer boundary of connected arc sections (arc a, 167.5° and arc b, 130°) having different center points $u_c$ and $v_c$ and radii u (178.0 cm) and v (92.1 cm), and an inner boundary of an arc section (arc c, 144°) having a center point $w_c$ and a radius w (105.0 cm). The distance between $u_c$ and center point of cyclonic member is 57.1 cm, and the distance between $w_c$ and center point of cyclonic member is 68.0 cm.

Figure 13A:
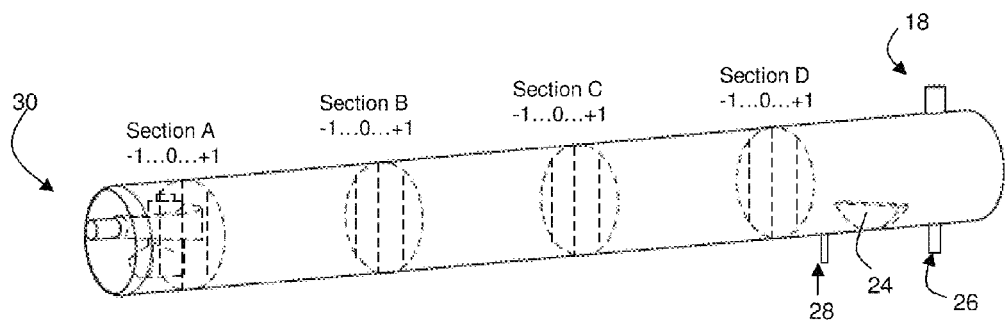
FIG. 13A is a schematic illustration of a separator vessel using a flow conditioner described herein in a comparative computer analysis.
Figure 13B:
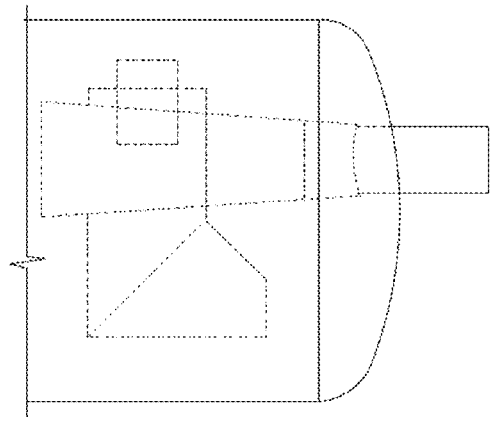
FIG. 13B is a side view of the inlet of the separator vessel of FIG. 13A.
Figure 13C:
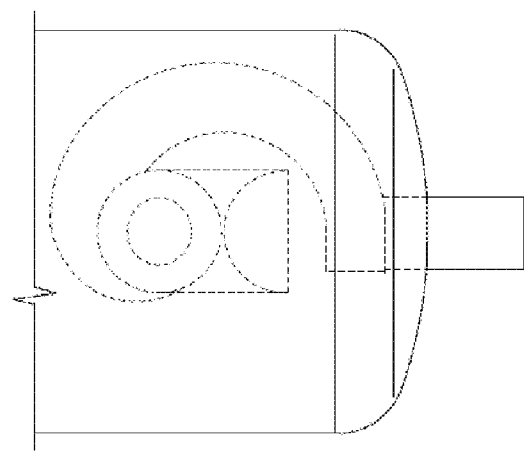
FIG. 13C is a top view of the inlet of the separator vessel of FIG. 13A.
Figure 13D:
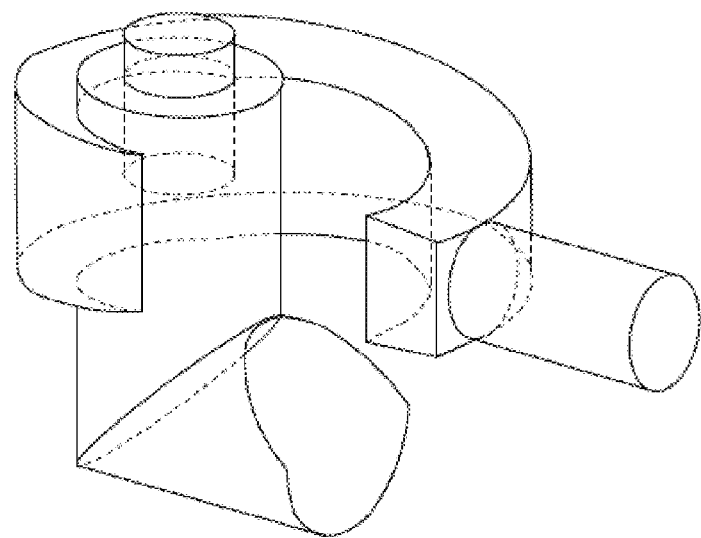
FIG. 13D is an isometric view of the flow conditioner described herein used in the computer analysis.
Figure 13E:
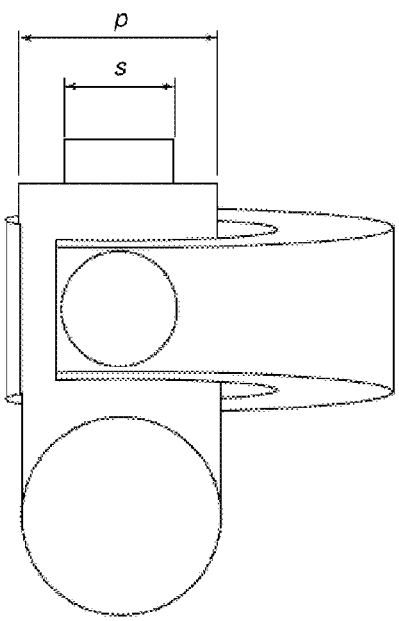
FIG. 13E is a front view of the flow conditioner described herein used in the computer analysis.
Figure 13F:
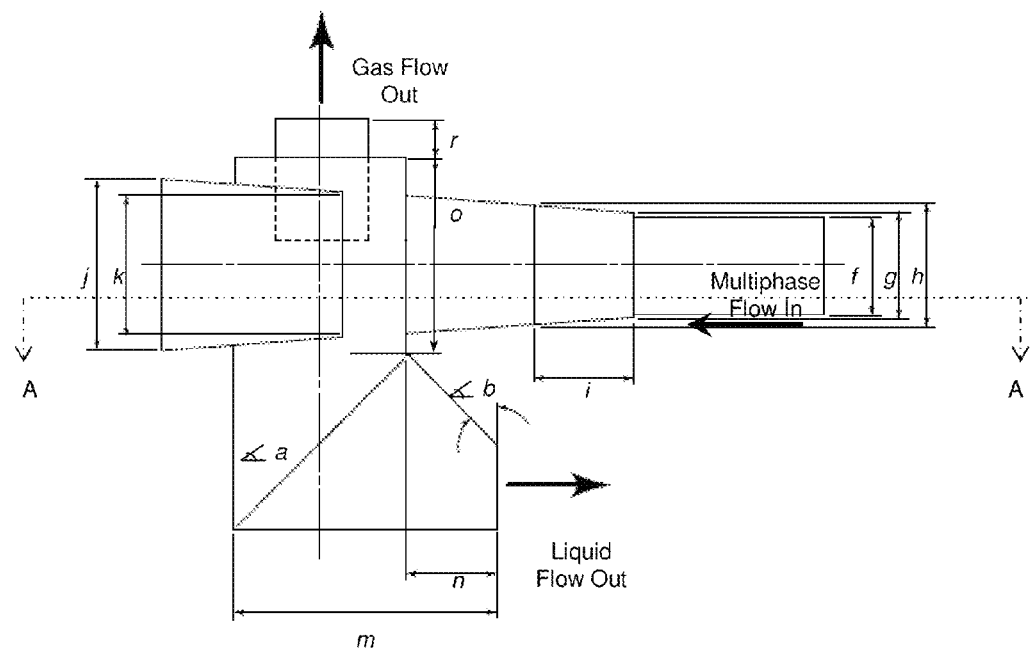
FIGS. 13F and 13G are side views of the flow conditioner described herein used in the computer analysis.
Figure 13G:
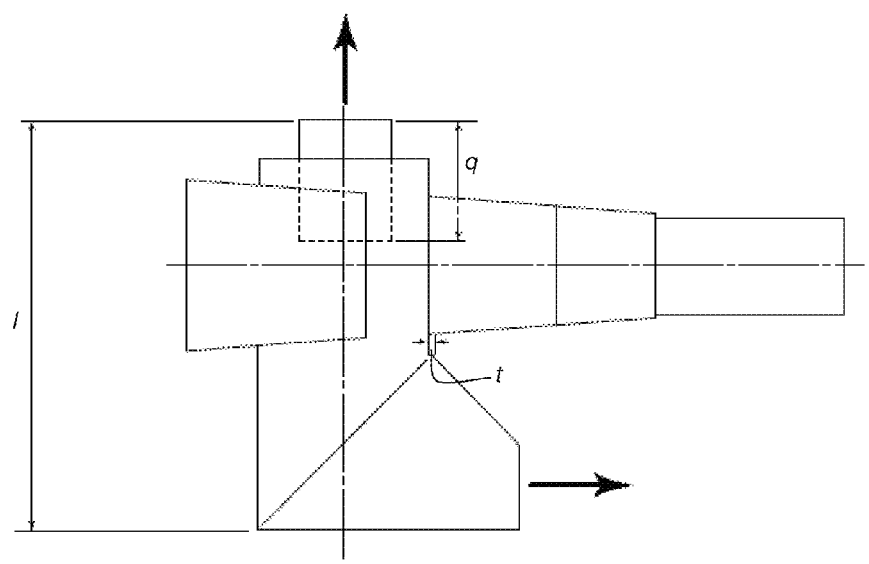
Figure 13H:
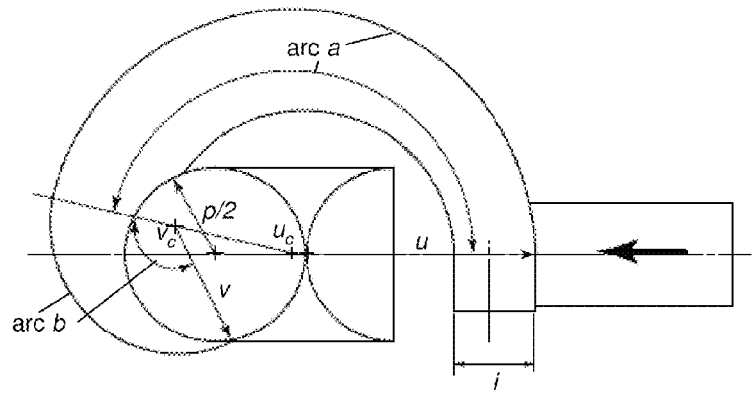
FIGS. 13H and 13I are sectional views of the flow conditioner described herein along section A-A in FIG. 13F.
Figure 13I:
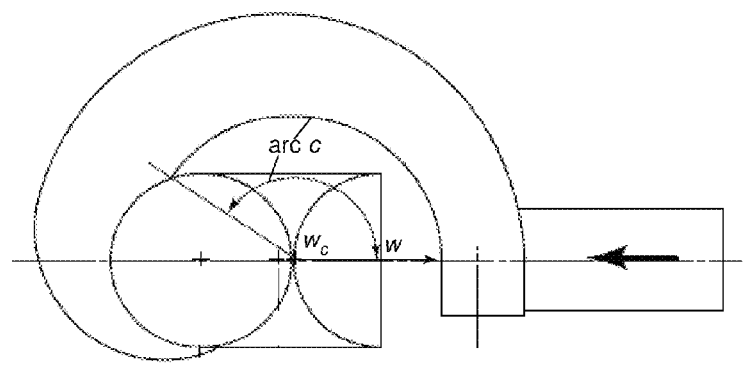

The results were analyzed along three vertical lines in four cross sections along the vessel as shown in FIGS. 12A and 13A. The first observation section A is located at a distance of 5 meters from the inlet end of the vessel; the distance between two successive observation sections is 10 meters. The vertical lines labeled 0 correspond to the vertical diameter of the vessel, observation lines labeled −1 and +1 are located one meter off the vertical diameter line.

The production stream from the wellhead entering the high-pressure production trap vessels is a mixture of gas, oil, water and suspended solids that separate simultaneously in one vessel. Modeling this flow is complicated by the various facets of the multi-fluid flow dynamics, featuring free-surface motion between gas and oil/water phases, mixing of oil and water, settling, particle deposition, and non-Newtonian behavior. The situation becomes even more complex if the water and oil phases form a stable emulsion.

The present simulations employ the Euler-Euler multiphase formulation model of ANSYS-CFX V.12.0 (commercially available from ANSYS, Inc. of Canonsburg, Pa., USA). Water, oil and gas are considered as isothermal, unmiscible and incompressible fluids. The three-phase mixture is assumed oil continuous, with the water and gas being considered dispersed phases in the form of spherical droplets and bubbles in the computed flow.

The momentum equation for a fluid phase α is:

$$\frac{\partial}{\partial t}(r_\alpha \rho_\alpha U_\alpha) + \nabla \cdot (r_\alpha (\rho_\alpha U_\alpha \otimes U_\alpha)) = -r_\alpha \nabla p_\alpha + \nabla \cdot (r_\alpha \mu_\alpha (\nabla U_\alpha + (\nabla U_\alpha)^T)) + \sum_{\beta=1}^{N_P} (\Gamma_{\alpha\beta}^+ U_\beta - \Gamma_{\beta\alpha}^+ U_\alpha) + S_{M\alpha} + M_\alpha \quad (1)$$

where $r_\alpha$ is the volume fraction of phase α(β);

$\rho_\alpha$ is the density of phase α(β);

$\mu_\alpha$ is the viscosity of phase α(β);

$S_{M\alpha}$ describes momentum sources due to external body forces;

$M_\alpha$ describes the interfacial forces acting on phase due to the presence of other phases; and $(\Gamma_{\alpha\beta}^+ U_\beta - \Gamma_{\alpha\beta}^+ U_\alpha)$ represents momentum transfer induced by interphase mass transfer and was set to zero for the purpose of this simulation.

The total force on phase a due to interaction with other phases is denoted $M_\alpha$, and is given by:

$$M_\alpha = \sum_{\beta \neq \alpha} M_{\alpha\beta} \quad (2)$$

where $M_{\alpha\beta}$ is the interphase momentum transfer due to interfacial forces acting on each phase α due to interaction with another phase β.

The total interfacial force acting between two phases arises from several independent physical effects:

$$M_{\alpha\beta} = M_{\alpha\beta}^D + M_{\alpha\beta}^L + M_{\alpha\beta}^{LUB} + M_{\alpha\beta}^{VM} + M_{\alpha\beta}^{TD} + \quad (30)$$

where $M_{\alpha\beta}^D$ is the interphase drag force;

$M_{\alpha\beta}^L$ is the lift force;

$M_{\alpha\beta}^{LUB}$ is the wall lubrication force;

$M_{\alpha\beta}^{VM}$ is the virtual mass force; and $M_{\alpha\beta}^{TD}$ is turbulence dispersion force.

The correlations for the force terms are fluid specific and impact the separation of the fluid phases in the simulation.

A predominant term for momentum transfer between the oil and water phases in the inhomogeneous multiphase flow is the drag force. The drag exerted on an immersed body by a moving fluid arises from two mechanisms. The first is due to the viscous surface shear stress, known as skin friction. The second is due to the pressure distribution around the body, known as the form drag. The total drag force is most conveniently expressed in terms of the dimensionless drag coefficient, $C_D$. In the present simulation, a user defined correlation dependent on the droplet diameter based Reynolds number was used for the water and gas phases drag coefficients to account for the viscous effects. An additional momentum source term was taken into account in the model in order to represent the non-drag forces such as the lift, wall lubrication, virtual mass and turbulence dispersion forces.

All simulations were conducted using the homogeneous Shear Stress Transport (SST) turbulence model. A single turbulence field is solved for all phases, which is suitable for free surface flows, separated flows, stratified flows and any situation where the phases tend to separate out.

The equation of continuity for multiphase flows is:

$$\frac{\partial}{\partial t}(r_\alpha \rho_\alpha) + \nabla \cdot (r_\alpha \rho_\alpha U_\alpha) = S_{MS\alpha} + \sum_{\beta=1}^{N_P} \Gamma_{\alpha\beta} \quad (4)$$

where $S_{MS\alpha}$ describes user specified mass sources; and $\Gamma_{\alpha\beta}$ represent the mass flow rate per unit volume from phase α to phase β. Since no interphase mass transfer is assumed, these terms were set to zero in our work.

The sum of the volume fractions of all the phases must be equal to unity all over the flow domain:

$$\sum_{\alpha=1}^{N_P} r_\alpha = 1 \quad (5)$$

This equation is combined with the continuity equation to obtain a transported volume conservation equation. For incompressible phases with no source terms, it simplifies into:

$$\sum_\alpha \nabla \cdot r_\alpha U_\alpha = 0 \qquad (6)$$

The multiphase flow at the vessel inlet was assumed as perfectly mixed phases. The flow composition computed at the three outlet ports (gas, oil and water) is driven by the separation process. In order to maintain water and oil levels within the limits of normal separator operation, a user-defined control strategy linking the liquid levels with the volumetric flow rates at the water and oil outlet ports was implemented. No assumptions were made in the liquid levels control strategy regarding the volume fractions of phases in the flow rates computed at the oil and water outlet ports. Such boundary conditions are useful to simulate the normal operation of the separator.

A mesh size of 105,000,000 mesh cells was used to provide a good description of the flow inside the large high-pressure production trap vessel; sharp gradients and interfaces are not adequately computed with a reduced mesh size. The simulation was performed using 93 clustered parallel processors (an IBM High Performance Cluster) to simulate 250 seconds of actual flow time. In order to optimize the run time, a variable time step was chosen.

Figure 14:
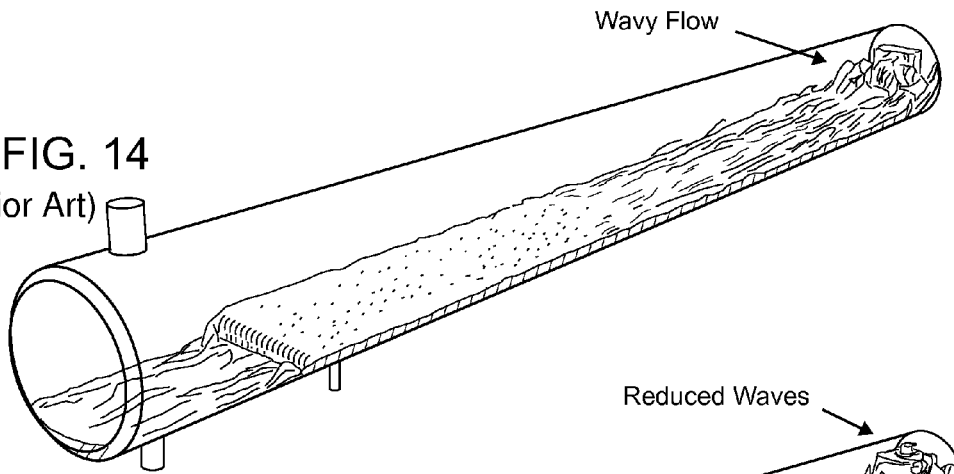
FIG. 14 shows computed gas/oil and oil/water interfaces inside the vessel at a given time modeled using the conventional momentum breaker box.
Figure 15:
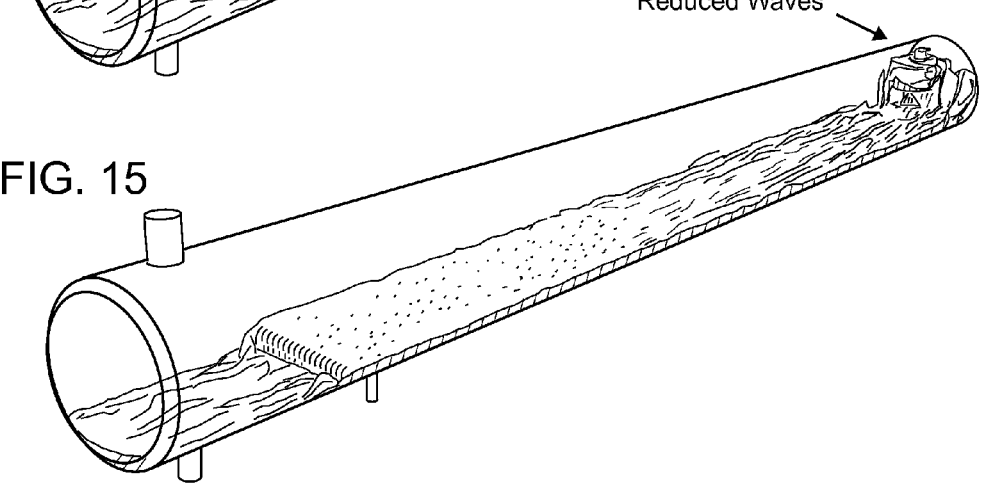
FIG. 15 shows computed gas/oil and oil/water interfaces inside the vessel at a given time modeled using the flow conditioner described herein at the inlet.

FIGS. 14 and 15 show computed gas/oil and oil/water interfaces inside the vessel at a given time. The carry-over and carry-under rates are calculated at each vessel outlet port. These data conclude to a liquid carry-over lower than 0.1 V %, oil-in-water content of 4 V % with the initial configuration and 3 V % with the new separator inlet device and a water-in-oil content less than 0.5 V % for both vessel configurations. These results, typical of good high-pressure production trap performance, were expected at the design flow capacity. The gas/liquid interface is found to be less wavy with the flow conditioner described herein at the inlet (FIG. 15) as compared to a conventional momentum breaker box (FIG. 14), thus suggesting less interaction between the phases, especially in the inlet zone of the vessel.

Figure 16:
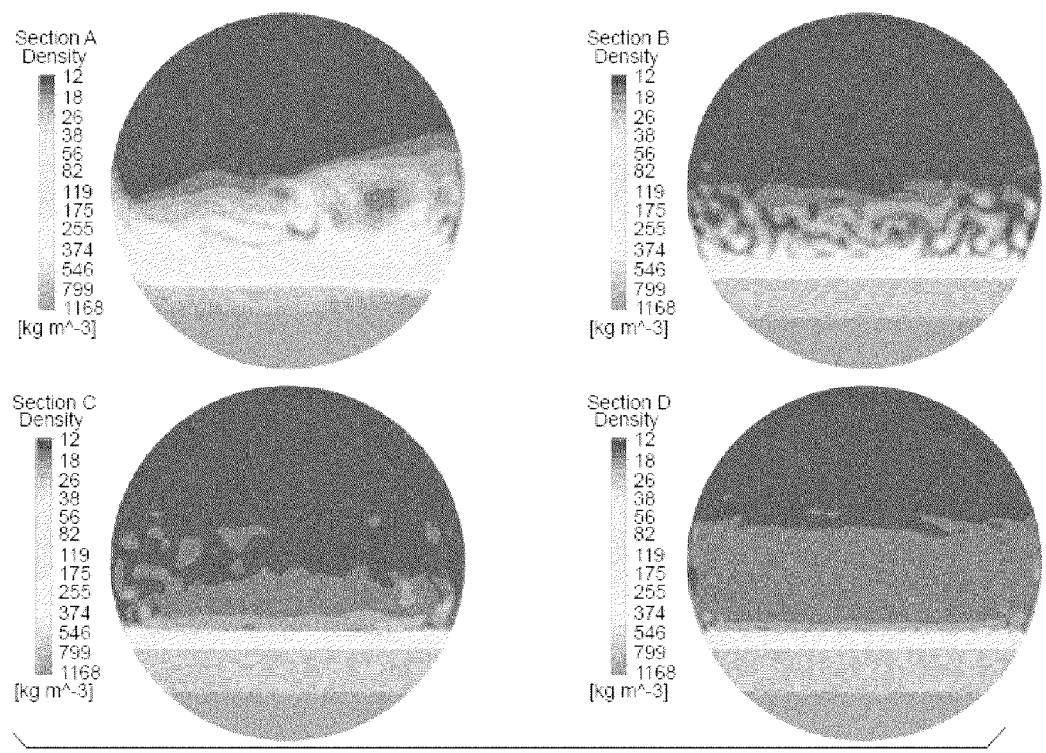
FIG. 16 are cross-section views of the density distribution within a high-pressure production trap using the conventional momentum breaker box.
Figure 17:
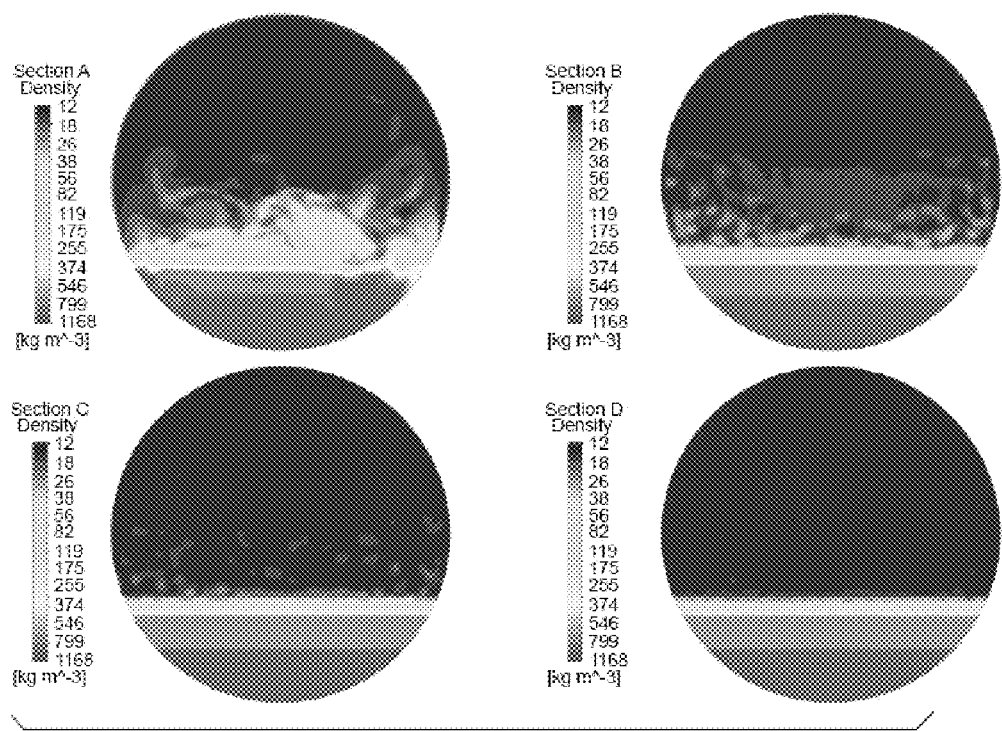
FIG. 17 are cross-section views of the density distribution within a high-pressure production trap using the flow conditioner described herein at the inlet.
Figure 18A:
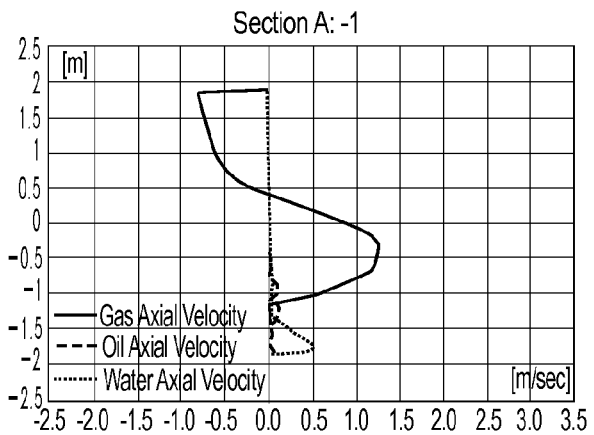
FIGS. 18A-18D are flow velocity profiles within the vessel with a conventional momentum breaker box.
Figure 18A:
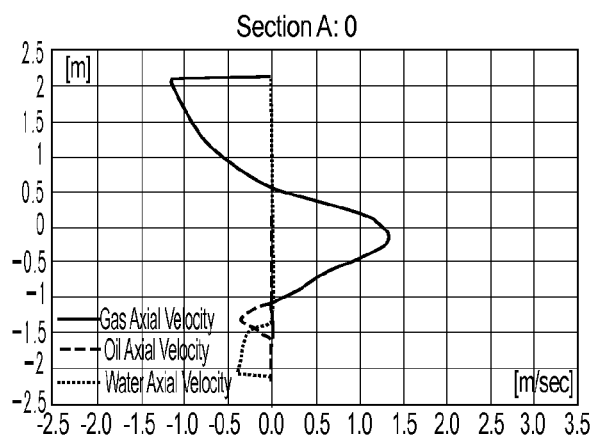
Figure 18A:
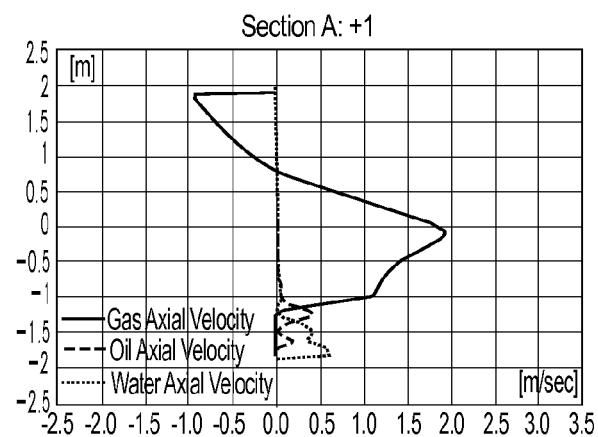
Figure 18B:
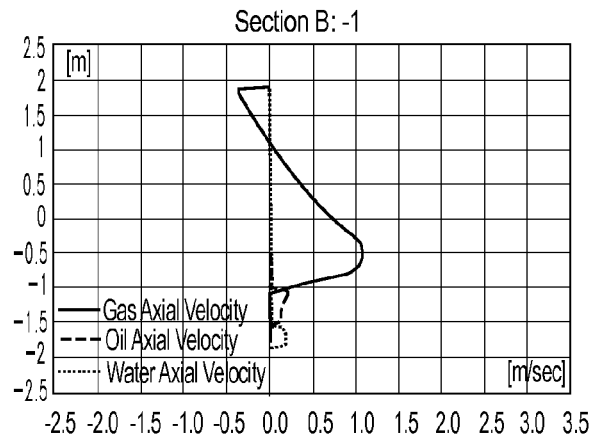
Figure 18B:
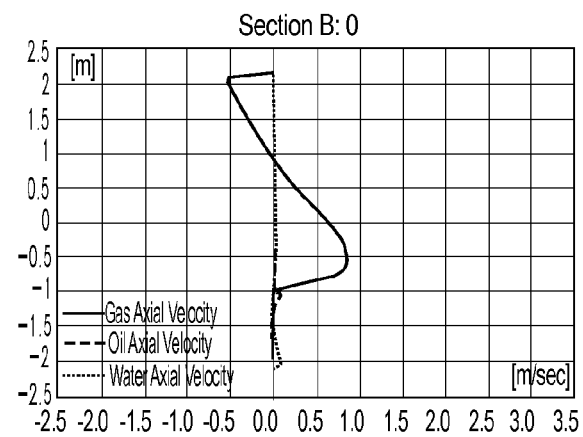
Figure 18B:
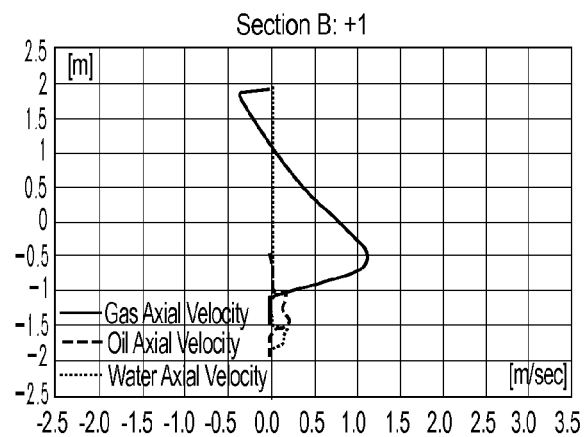
Figure 18C:
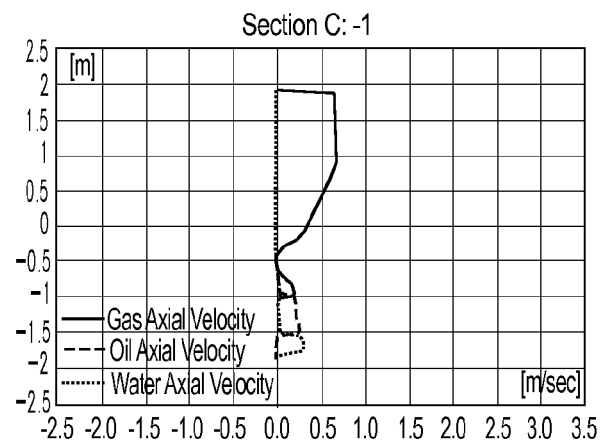
Figure 18C:
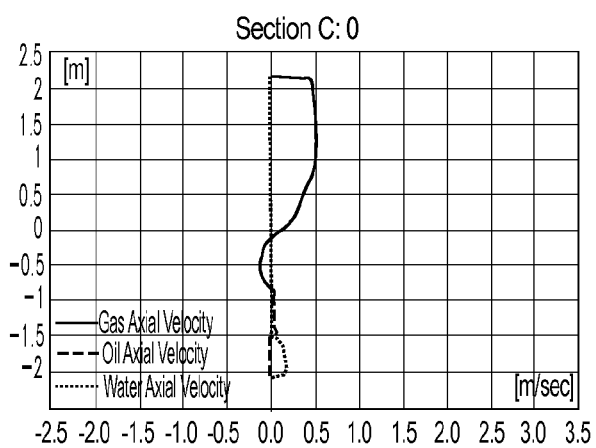
Figure 18C:
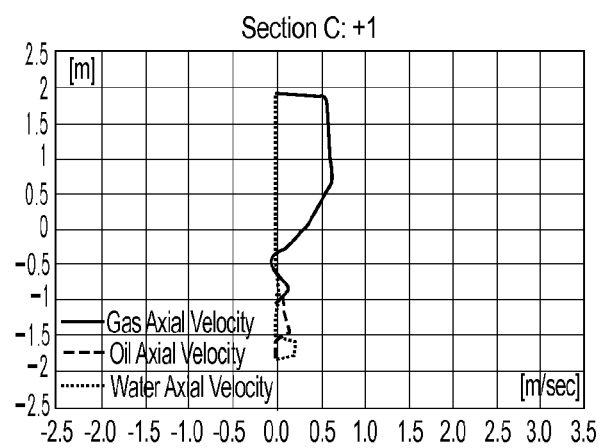
Figure 18D:
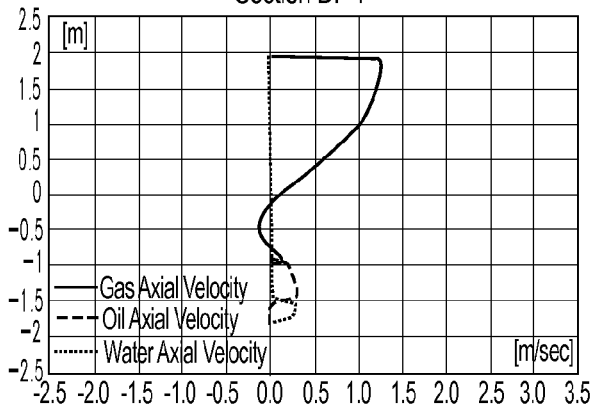
Figure 18D:
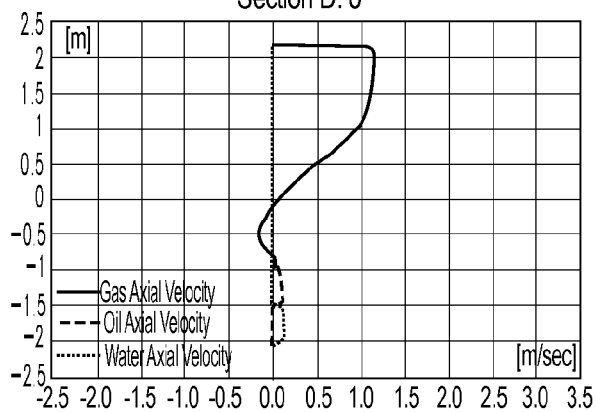
Figure 18D:
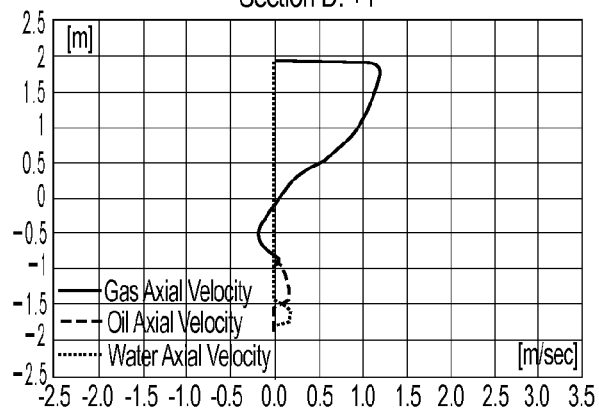
Figure 19A:
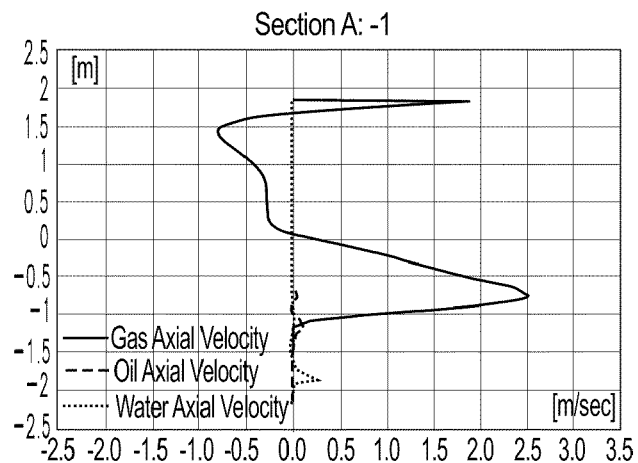
FIGS. 19A-19D are flow velocity profiles within the vessel with a flow conditioner described herein.
Figure 19A:
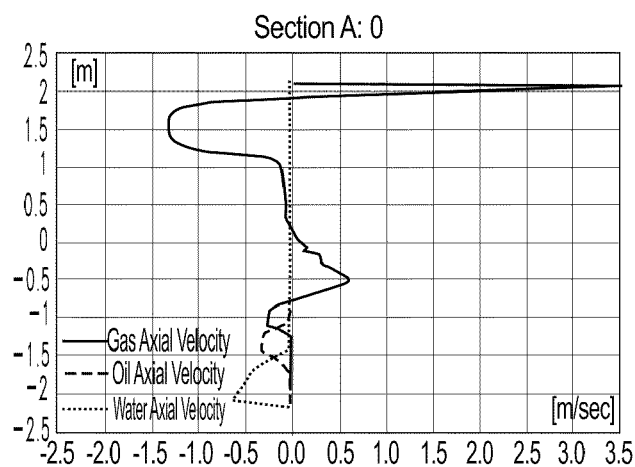
Figure 19A:
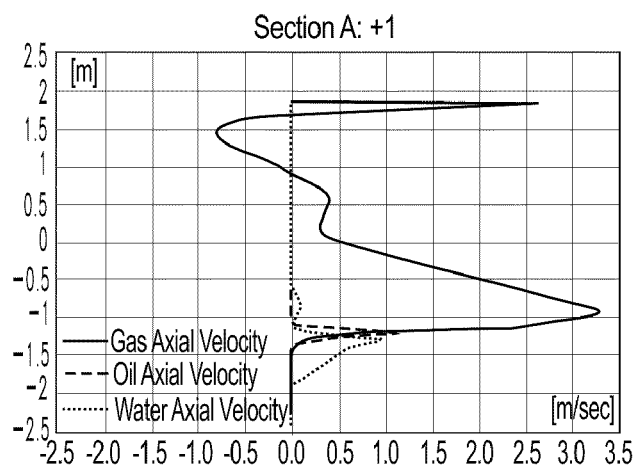
Figure 19B:
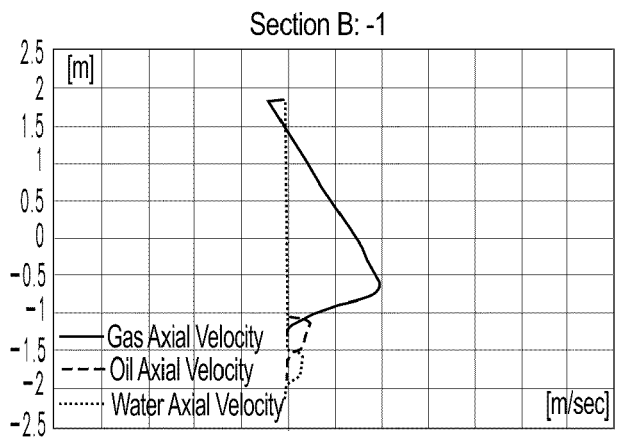
Figure 19B:
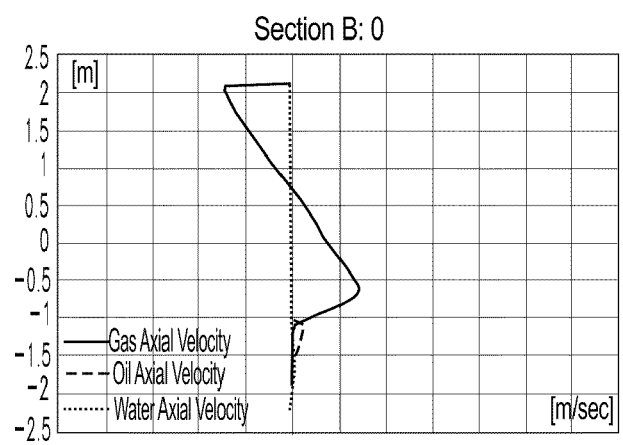
Figure 19B:
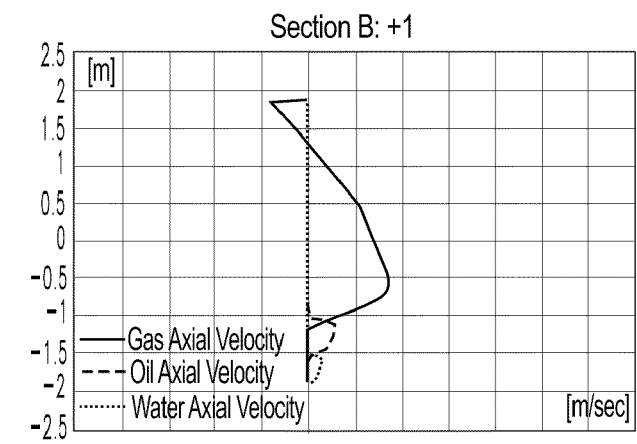
Figure 19C:
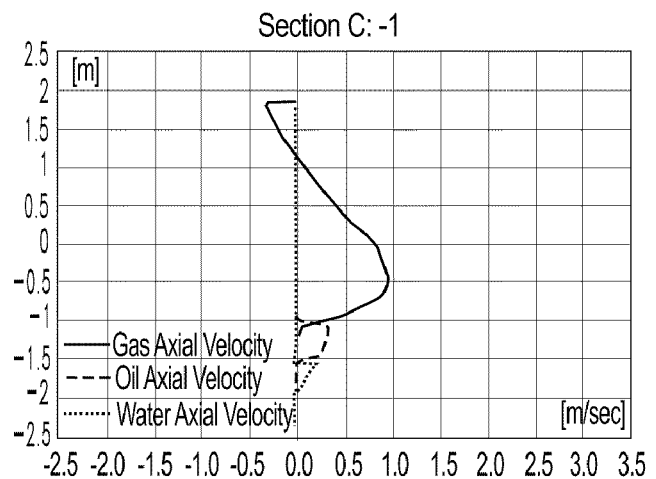
Figure 19C:
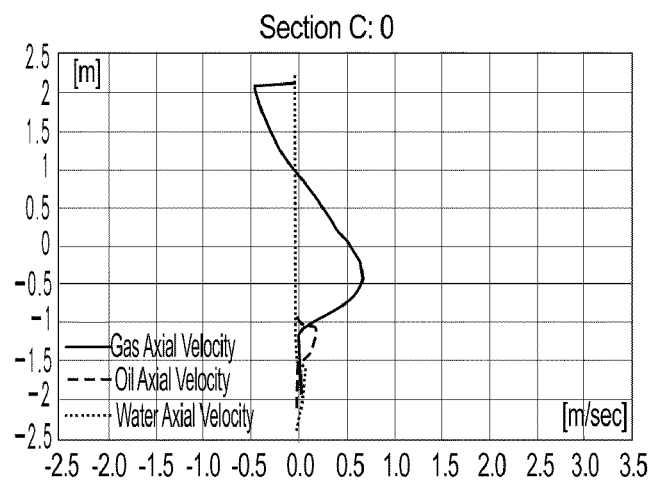
Figure 19C:
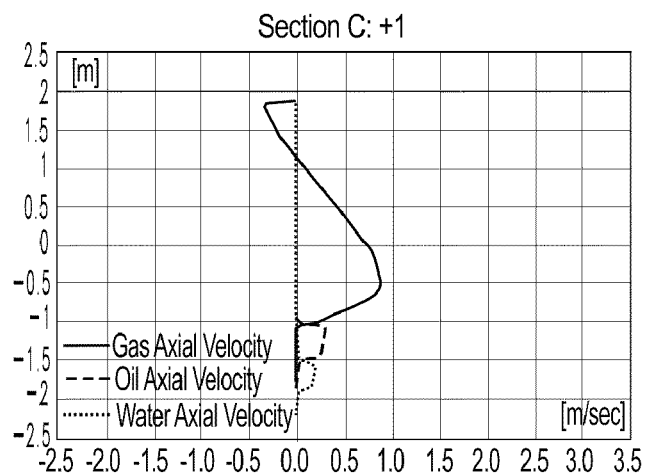
Figure 19D:
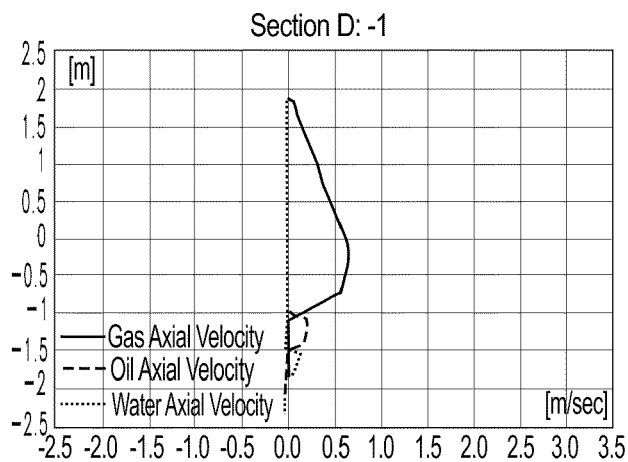
Figure 19D:
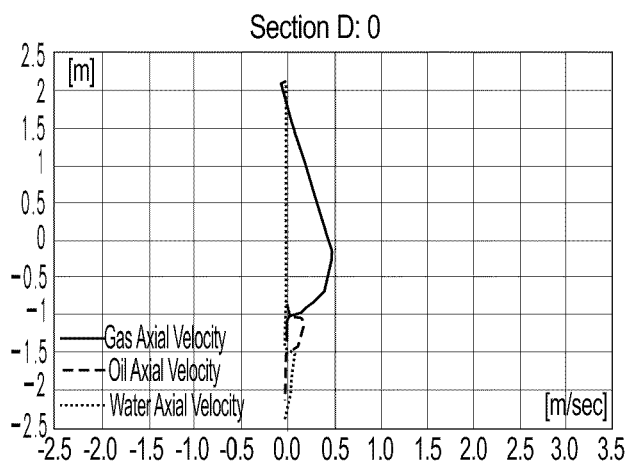
Figure 19D:
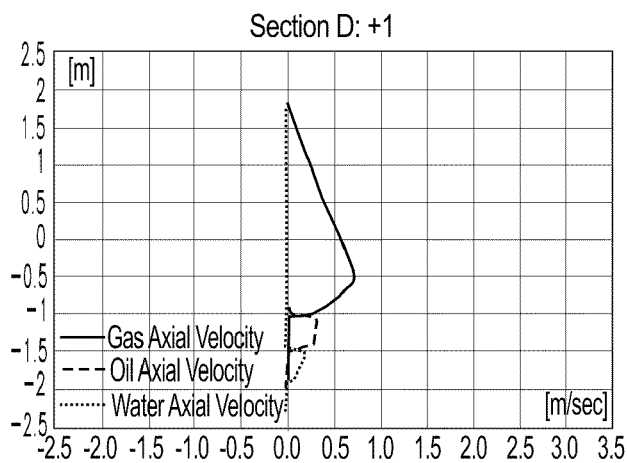

FIGS. 16 and 17 are cross-section views of the density distribution. These graphs show mixture zones locations and their evolution along the vessel. The amount of separation achieved at section B with the apparatus of the present invention (FIG. 17) is similar to the separation achieved in section C with the initial vessel configuration. The phases segregate earlier in the gas/liquid interface region when the vessel is equipped with the apparatus of the present invention.

FIGS. 18A-18D and 19A-19D show the velocity component perpendicular to the observation cross-sections plotted along vertical lines for each fluid phase. In all observation sections, the different velocity profiles observed at the three vertical lines −1, 0 and 1 confirm that the flows are fully tri-dimensional inside the vessel. This type of flow could not be simulated using plane symmetry conditions as a large part of the interaction between the phases, which is lying in the tri-dimensional nature of the flow, would be missed.

The velocity profiles in section A are very disturbed for both inlet configurations, with significant backflow predicted in the center line of the vessel (graphs labeled A:0) for the two liquid phases. The velocity profiles in section A are overlapping over a wide layer of the liquid flow, which puts in evidence a large amount of mixing between the oil and the water phases. The disturbed gas velocity profiles observed in FIG. 19A can be explained by the fact that the three observation lines are located in the wake of the separator inlet device in the gas phase layer. However, a lower amount of gas is entrained in the liquid phases in the inlet region when the separator is equipped with the flow conditioner described herein at the inlet.

Comparing velocity profiles in FIGS. 18 and 19 at section B shows that uniform flow is achieved earlier in the liquid layer with the flow conditioner described herein at the inlet. At this stage, the gas velocity profiles are similar for both configurations but the interaction and mixing between the gas and the liquid phases is higher in the initial design as can be seen in the plots at altitude levels between −1 m and −0.5 m. This confirms that early separation of the gas phase inside the vessel resulting from the flow conditioning apparatus described herein reducing the interaction between phases thus contributing to a smoother gas-liquid interface, as shown earlier in FIG. 15.

At sections C and D, stratified flows are observed with the three phases interacting with each other, due to viscous friction at their interface. However, the gas velocity profiles in FIG. 18 are still showing a backflow region just above the gas/oil interface in section D. This indicates a large tri-dimensional flow structure in the gas phase occupying the top half of the vessel. With the flow conditioner described herein at the inlet separator inlet device, the backflow region in the gas phase is confined in the upper part of the vessel and is not present anymore in section D.

From section B downstream to section D, the oil and water phases velocity profiles are showing a large volume of undisturbed, uniform flow with the new inlet device when, comparatively, they show more dissymmetry in every observation section in the initial vessel configuration, with even some local back flow found in the center line in section B.

Accordingly, even if the flows are significantly disturbed in the separator inlet zone, better flow characteristics are predicted in the separator settling zone, from section B downstream, when the high-pressure production trap is equipped with the flow conditioner apparatus described herein. Consequently, it is anticipated that benefits to the separation process resulting from the flow improvements obtained with the inlet design change can be in the form of an increased production capacity.

The apparatus and method of the present invention have been described above and in the attached drawings; however, modifications will be apparent to those of ordinary skill in the art and the scope of protection for the invention is to be defined by the claims that follow.

The invention claimed is:

1. A conditioning apparatus for separating gas from a multi-component flowing fluid containing a mixture of gas, water and oil and for promoting the coalescence of water droplets in the oil-water mixture, the apparatus comprising:

a fluid deceleration member having an entry portion and a transition portion, the entry portion having an inlet for receiving the flowing fluid mixture and a curvilinear conduit having an increasing cross-sectional flow area downstream of the inlet, the entry portion being joined to, and in fluid communication with the transition portion having an outer curvilinear wall, wherein the entry portion and the transition portion define a deceleration member fluid passage; and a cyclonic member having an inlet adjoined to the deceleration member through convergence of the transition portion outer curvilinear wall and a downstream side of the cyclonic member inlet and convergence of an inner boundary wall of the entry portion and an upstream side of the cyclonic member inlet and a riser section at an upper end of the cyclonic member, wherein the cyclonic member inlet is positioned in the sidewall of the cyclonic member intermediate its upper and lower ends.

2. The apparatus of claim 1 wherein the cyclonic member riser section includes an opening in the upper end for discharging gas separated from the mixture and an opening in the lower end for discharging oil and water.

3. The apparatus of claim 2 further comprising a second riser section within the cyclonic member riser section.

4. The apparatus of claim 1 in which the outer wall of the transition portion intersects the outer wall of the cyclonic member in a generally tangential relation, whereby the fluid passes from the deceleration member into the cyclonic member at approximately the same radial velocity.

5. The apparatus of claim 1 in which the fluid path defined by the deceleration member is generally horizontal.

6. The apparatus of claim 1 in which the outlet of the deceleration member is disposed at a right angle to the principal direction of the fluid flow in the entry portion.

7. The apparatus of claim 1 in which the deceleration member is in a downward plane along the direction of fluid flow.

8. The apparatus of claim 1 further comprising a return member joined to, and in fluid communication with the outlet end of the cyclonic member.

9. The apparatus as in claim 1, wherein the cross-sectional shape along the fluid passage is configured and dimensioned to promote the escape of gas in a gas-liquid mixture, to obtain a uniform velocity profile and to minimize shear stresses in the fluid flow.

10. The apparatus of claim 1 wherein
the cross-sectional shape along the curvilinear path of the inlet of the entry portion is square and progressively changes into a rectangular cross-sectional shape; and
the transition portion is characterized by a curvilinear-shaped outer wall and a curvilinear-shaped inner opening region that is open and connected to, or integral with, the inlet of the cyclonic member.

11. The apparatus as in claim 10, wherein an outer boundary wall of the entry portion and the outer curvilinear wall of the transition portion is a contiguous outer boundary of the deceleration member fluid passage.

12. The apparatus as in claim 11, wherein a centerline is formed between outer boundary wall and the inner boundary wall of the entry portion.

13. The apparatus as in claim 12, wherein the radius of curvature of the centerline decreases along the fluid flow direction.

14. The apparatus as in claim 13, wherein the centerline is in the shape of a portion of a spiral.

15. The apparatus as in claim 13, wherein the centerline is in the shape of two or more connected arc sections having different center points and radii.

16. The apparatus as in claim 10, wherein the curvilinear-shaped outer wall intersects the downstream side of the cyclonic member inlet in a tangential relation.

17. The apparatus as in claim 1, wherein the cyclonic member is vertically aligned and has a cylindrical shape with the exception of the inlet portion void.

18. The apparatus as in claim 17, wherein the inlet of the cyclonic member spans about one half or more of the circumference of the cyclonic member and has a height that corresponds to the connecting section of the transition portion.

19. The apparatus as in claim 17, wherein the internal diameter of the cyclonic member at a horizontal plane crossing the cyclonic member is in the range of about $(2*S)^{1/2}$ to about $(5*S)^{1/2}$, wherein S is the area of the deceleration member inlet.

20. The apparatus as in claim 19 wherein the internal diameter of the cyclonic member increases along the direction of fluid flow from top to bottom.

21. The apparatus as in claim 1, wherein a ratio of the cyclonic member inlet area to the entry section inlet area between about 1.2:1 to about 5.0:1.

22. The apparatus as in claim 1, wherein the fluid deceleration member defines a fluid path that is declined from the horizontal at an angle that permits gravitational forces to promote the flow of fluid and prevent backflow while also promoting the desired deceleration.

23. The apparatus as in claim 22, wherein the angle is up to about 8 degrees.

24. The apparatus as in claim 22, wherein the angle is up to about 4 degrees.

25. The apparatus as in claim 1 contained in a separation vessel.

26. The apparatus as in claim 25 wherein the separation vessel is a gas oil separation vessel.

* * * * *